US012513111B2

(12) United States Patent
Cai et al.

(10) Patent No.: US 12,513,111 B2
(45) Date of Patent: Dec. 30, 2025

(54) FIREWALL ACCESS RULE AUTHENTICATED BY SECURITY ASSERTION MARKUP LANGUAGE (SAML)

(71) Applicant: SonicWALL Inc., Milpitas, CA (US)

(72) Inventors: Riji Cai, Milpitas, CA (US); Hao Zhang, Milpitas, CA (US); Rui Zheng, Milpitas, CA (US)

(73) Assignee: SonicWALL Inc., Milpitas, CA (US)

( * ) Notice: Subject to any disclaimer, the term of this patent is extended or adjusted under 35 U.S.C. 154(b) by 258 days.

(21) Appl. No.: 18/210,569

(22) Filed: Jun. 15, 2023

(65) Prior Publication Data

US 2024/0422125 A1    Dec. 19, 2024

(51) Int. Cl.
*H04L 9/40* (2022.01)
(52) U.S. Cl.
CPC .......... *H04L 63/0209* (2013.01); *H04L 63/08* (2013.01)
(58) Field of Classification Search
CPC ..... H04L 63/0209; H04L 63/08; H04L 63/02; H04L 63/0815
See application file for complete search history.

(56) References Cited

U.S. PATENT DOCUMENTS

| | | | | |
|---|---|---|---|---|
| 7,185,361 B1 * | 2/2007 | Ashoff | ............... | H04L 63/08 726/13 |
| 7,305,705 B2 * | 12/2007 | Shelest | ............... | H04L 63/08 726/11 |
| 8,484,716 B1 * | 7/2013 | Hodgson | ............... | H04L 63/02 726/11 |
| 8,850,546 B1 * | 9/2014 | Field | ............... | H04L 63/102 726/8 |
| 9,137,131 B1 * | 9/2015 | Sarukkai | ............... | H04L 43/0876 |
| 9,661,083 B1 * | 5/2017 | Eykholt | ............... | H04L 67/147 |
| 9,729,539 B1 * | 8/2017 | Agrawal | ............... | H04L 63/0815 |

(Continued)

FOREIGN PATENT DOCUMENTS

| EP | 24182581.9 | 6/2024 |
|---|---|---|
| EP | 4478665 | 12/2024 |

OTHER PUBLICATIONS

EP Application No. 24182581.9, Extended European Search Report dated Oct. 21, 2024.

*Primary Examiner* — Aravind K Moorthy
(74) *Attorney, Agent, or Firm* — PATENT CAPITAL GROUP

(57) ABSTRACT

Disclosed are systems, apparatuses, methods, computer readable medium, and circuits for providing access to a network. According to at least one example, a method includes: intercepting a request at a firewall the request sent from a computing device regarding establishment of a secure communication session with a network; in response to determining that the request is unauthenticated, notifying a service provider node of the request, wherein the service provider node is configured to: generating a communication session between the computing device and a RBI server; receiving at the firewall authentication information pertaining to authorization for the computing device to establish the secure communication session with the network; identifying that the secure communication session is allowed to be established based on the authentication information; and providing access at the firewall to the computing device to establish the secure communication session with the network.

20 Claims, 5 Drawing Sheets

(56) References Cited

U.S. PATENT DOCUMENTS

| | | | |
|---|---|---|---|
| 10,148,621 B2* | 12/2018 | Benari | H04L 63/0281 |
| 10,798,059 B1* | 10/2020 | Singh | H04L 63/029 |
| 10,944,561 B1* | 3/2021 | Cahill | H04L 9/3213 |
| 11,240,205 B1* | 2/2022 | Ramesh | H04L 63/101 |
| 11,258,756 B2* | 2/2022 | Huang | G06F 21/335 |
| 11,579,955 B1* | 2/2023 | Wilson | G06F 16/986 |
| 11,593,606 B1* | 2/2023 | LaBorde | G06N 3/08 |
| 11,863,530 B1* | 1/2024 | Sreekumar | H04L 63/20 |
| 12,058,137 B1* | 8/2024 | Hanwella | H04L 63/0263 |
| 2005/0268333 A1* | 12/2005 | Betts | H04L 63/12 726/11 |
| 2008/0028445 A1* | 1/2008 | Dubuc | H04L 63/0892 726/5 |
| 2011/0252462 A1* | 10/2011 | Bonanno | H04L 63/02 726/14 |
| 2012/0110469 A1* | 5/2012 | Magarshak | H04L 63/0421 715/747 |
| 2012/0214444 A1* | 8/2012 | McBride | H04L 63/08 455/411 |
| 2014/0223532 A1* | 8/2014 | Satoh | H04L 63/0815 726/7 |
| 2014/0297863 A1* | 10/2014 | Zhu | H04L 63/08 709/225 |
| 2014/0298419 A1* | 10/2014 | Boubez | H04L 63/08 726/4 |
| 2015/0039677 A1* | 2/2015 | Kahol | H04L 63/20 709/203 |
| 2015/0200926 A1* | 7/2015 | Fukuda | H04L 63/0815 726/5 |
| 2016/0094546 A1* | 3/2016 | Innes | H04L 63/0876 713/156 |
| 2016/0162988 A1* | 6/2016 | Englehart | G06Q 40/03 705/38 |
| 2016/0217312 A1* | 7/2016 | Gardiner | H04L 63/0861 |
| 2016/0234209 A1* | 8/2016 | Kahol | G06F 21/305 |
| 2017/0004500 A1* | 1/2017 | Lim | G06Q 20/405 |
| 2017/0063927 A1* | 3/2017 | Schultz | H04L 63/10 |
| 2017/0142129 A1* | 5/2017 | Peng | H04L 63/061 |
| 2018/0007059 A1* | 1/2018 | Innes | G06F 21/6218 |
| 2018/0097840 A1* | 4/2018 | Murthy | H04L 63/02 |
| 2018/0115547 A1* | 4/2018 | Peterson | H04L 63/029 |
| 2018/0198791 A1* | 7/2018 | Desai | H04L 63/0807 |
| 2018/0227759 A1* | 8/2018 | Liu | H04W 76/50 |
| 2018/0302391 A1* | 10/2018 | Jones | G06F 16/284 |
| 2018/0367499 A1* | 12/2018 | Bansal | H04L 61/30 |
| 2019/0007409 A1* | 1/2019 | Totale | H04L 9/3247 |
| 2019/0081927 A1* | 3/2019 | Pham | H04L 63/0263 |
| 2019/0245848 A1* | 8/2019 | Divoux | H04L 63/0815 |
| 2019/0319946 A1* | 10/2019 | Fan | H04L 9/3213 |
| 2019/0386980 A1* | 12/2019 | Kludy | H04L 63/0838 |
| 2020/0036699 A1* | 1/2020 | Suresh | H04L 63/083 |
| 2020/0045015 A1* | 2/2020 | Nukala | H04L 63/1416 |
| 2020/0099658 A1* | 3/2020 | Couillard | G09C 1/00 |
| 2020/0145420 A1* | 5/2020 | Haletky | H04L 63/0884 |
| 2020/0177596 A1* | 6/2020 | Grobelny | H04L 63/102 |
| 2020/0314066 A1* | 10/2020 | Cruz Farmer | H04L 63/0245 |
| 2021/0029146 A1* | 1/2021 | Kancherla | H04W 12/088 |
| 2021/0075811 A1* | 3/2021 | Gupta | H04L 63/1425 |
| 2021/0075832 A1* | 3/2021 | Bisztrai | H04L 65/1069 |
| 2021/0165879 A1* | 6/2021 | Duo | H04L 63/145 |
| 2021/0166515 A1* | 6/2021 | Durham, III | H04W 12/71 |
| 2021/0250333 A1 | 8/2021 | Negrea | |
| 2021/0314310 A1* | 10/2021 | Cao | G06F 9/44505 |
| 2021/0349867 A1* | 11/2021 | Faber | H03M 7/30 |
| 2022/0100827 A1* | 3/2022 | Nomura | G06F 21/45 |
| 2022/0150066 A1* | 5/2022 | Sugarev | H04L 9/3247 |
| 2022/0188438 A1* | 6/2022 | Lewin | H04L 63/20 |
| 2022/0200990 A1* | 6/2022 | Madej | H04L 63/0807 |
| 2022/0215005 A1* | 7/2022 | Bidkar | H04L 63/0263 |
| 2022/0217124 A1* | 7/2022 | Fryer | H04L 63/10 |
| 2022/0337590 A1* | 10/2022 | Jaiswal | H04L 63/0815 |
| 2022/0407850 A1* | 12/2022 | Blasi | H04L 9/3213 |
| 2022/0417216 A1* | 12/2022 | Elliott | G06F 13/4282 |
| 2023/0022478 A1 | 1/2023 | Batchu | |
| 2023/0088489 A1* | 3/2023 | Szczepanik | H04L 63/10 726/11 |
| 2023/0129776 A1* | 4/2023 | Agarwal | H04L 63/102 726/3 |
| 2023/0145127 A1* | 5/2023 | Barnum | H04L 63/102 726/4 |
| 2023/0164178 A1* | 5/2023 | Singh | H04L 63/101 726/4 |
| 2023/0229752 A1* | 7/2023 | Brooks | H04L 63/0823 726/10 |
| 2023/0247003 A1* | 8/2023 | Chanak | H04L 9/3226 726/1 |
| 2023/0328091 A1* | 10/2023 | Proynov | H04L 63/1433 726/25 |
| 2023/0379265 A1* | 11/2023 | Masters | G06Q 20/401 |
| 2023/0409680 A1* | 12/2023 | Blachman | G06F 21/31 |
| 2024/0004673 A1* | 1/2024 | Liu | G06F 9/44505 |
| 2024/0012904 A1* | 1/2024 | Goradia | G06F 21/51 |
| 2024/0022555 A1* | 1/2024 | Koikara | G06F 21/606 |
| 2024/0036892 A1* | 2/2024 | Goradia | G06F 21/6263 |
| 2024/0098102 A1* | 3/2024 | Sloane | H04L 63/1425 |
| 2024/0223534 A1* | 7/2024 | Gu | H04L 63/0236 |
| 2024/0291837 A1* | 8/2024 | Levari | H04L 63/1425 |
| 2024/0333734 A1* | 10/2024 | Barton | H04L 41/065 |
| 2024/0356901 A1* | 10/2024 | Spillman | H04L 63/0218 |
| 2024/0380737 A1* | 11/2024 | Brown | H04L 63/0209 |
| 2024/0388589 A1* | 11/2024 | Venkatesan | H04L 63/102 |
| 2025/0039161 A1* | 1/2025 | Gangadharappa | H04L 63/08 |
| 2025/0047656 A1* | 2/2025 | Chen | H04L 63/083 |

* cited by examiner

FIREWALL ACCESS RULE AUTHENTICATED BY SECURITY ASSERTION MARKUP LANGUAGE (SAML)

FIELD OF THE TECHNOLOGY

The subject matter of the disclosure generally relates to a computing device that is between a client device and a network, selectively identifying when to perform a function on data being transmitted between the client device and the network. More specifically, the present disclosure relates to access control for a computing device when connecting to a server with SAML authentication.

BACKGROUND

As computer networks have become increasingly popular and pervasive, there is an increased need for secure access to networked resources. As organizations move to digitize their business processes, there is an increased need for secure access to enterprise networks. Firewalls are a critical component of an organization's security infrastructure and are used to protect the internal network from external threats. A firewall typically blocks or filters traffic and malicious activity such as DDoS attacks, malware infections, and other cyberattacks based on predetermined rules that determine whether the connection request should be accepted or rejected. By leveraging firewalls, organizations can ensure that only authenticated users are allowed access to a particular network or resource.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
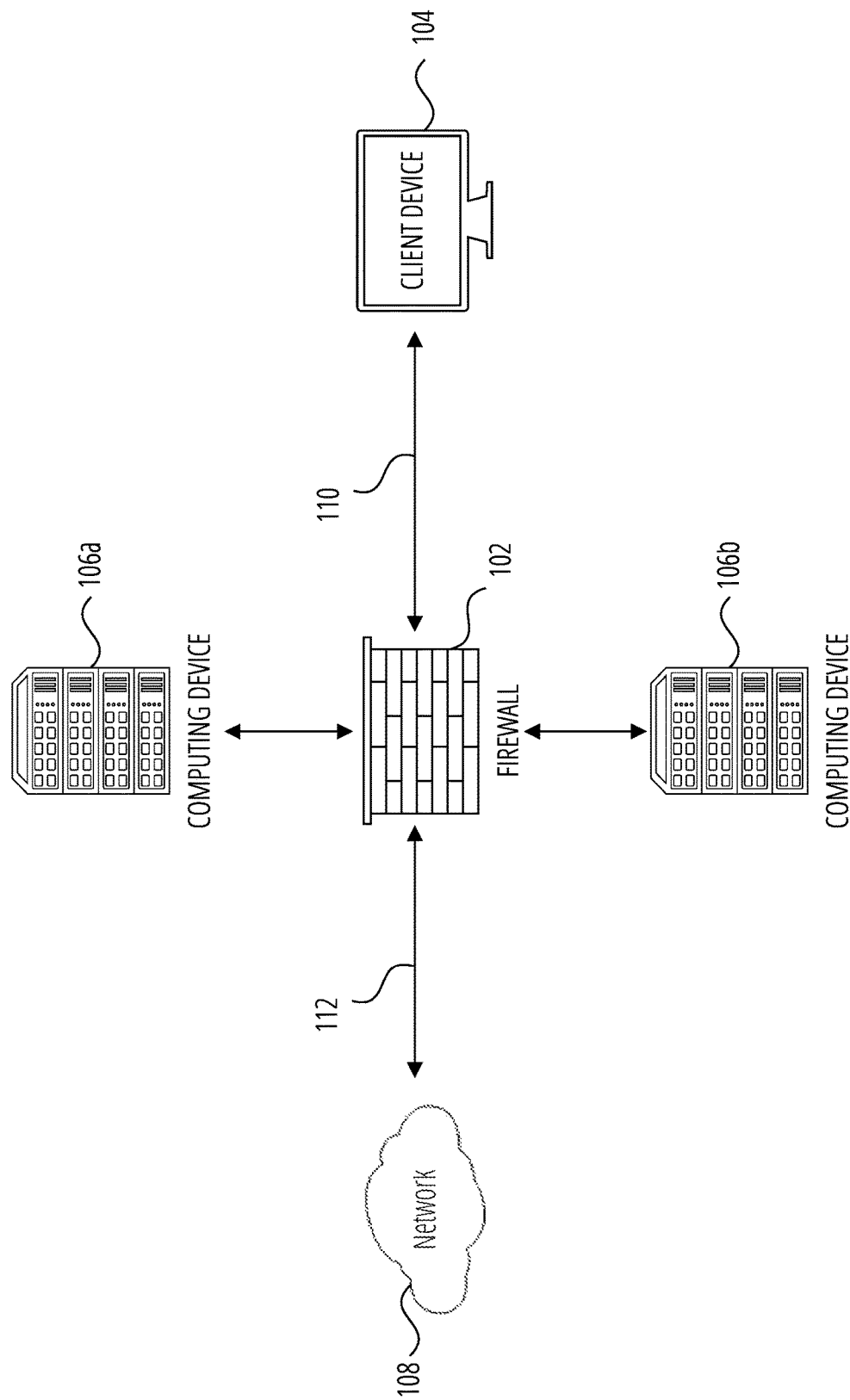
FIG. 1 illustrates communications being intercepted between client devices and a network within a protected network, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The proposed solution is directed towards providing a computing device access to a secured network. The disclosure provides for a user equipment (UE) attempting to connect to a network through a firewall to submit a request for access, which is intercepted by one or more access rules associated with the firewall. When the firewall determines that the UE request is unauthenticated, it notifies a SAML Service Provider (SP) of the request. The SAML SP then generates a secure redirect weblink which is sent back to the user's browser. This occurs when the redirect link opens a tab window in the user equipment's browser and is connected to a remote browser isolation (RBI) device. The RBI, in turn, communicates with a SAML Identity Provider (IDP) to complete the authentication process. Upon successful authentication, the firewall is notified and provides the user equipment access to the network.

When dealing with communications between a local area network (LAN) and wide area network (WAN), authentication of users can be challenging. In traditional methods of firewall set up, when an unauthenticated user makes a request to a website on the WAN side, the firewall will parse the request and trigger an access control list (ACL) to generate a login page for that user. Upon the introduction of SAML authentication, SAML authentication packets are often restricted from the WAN, because the firewall could not distinguish between packets for authentication and those that were meant to access the WAN website. Thus, the SAML authentication requests are not allowed through. Thus, the proposed solution addresses the need for accurately identifying internet resources that are embedded in a login page and being able to dynamically prepare for external resources that may be volatile regarding a user's location, while attempting to access the secured network of the login page.

In one aspect, a method is disclosed for providing access to a network. The method includes intercepting a request, at a firewall, sent from a computing device, the request configured to transmit a plurality of security assertion markup language (SAML) requests. The method includes in response to determining that the resource request is unauthenticated, notifying a service provider node of the resource request. The service provider node is configured to generate a communication session between the computing device and a RBI server. The method includes receiving, at the firewall, authentication information pertaining to authorization for the computing device to establish the secure communication session with the network. The method includes identifying that the secure communication session is allowed to be established based on the authentication information. The method includes providing access, at the firewall, to the computing device to permit the computing device with access to the network.

In another aspect, the request includes a resource request and an authentication request.

In another aspect, the resource request includes an authentication request to connect to a network.

In another aspect, the RBI server is configured to communicate with an identity provider node, wherein the identity provider node is configured to verify the authentication request prior to authorization by the firewall, of the computing device to establish the secure communication session with the network.

In another aspect, the intercepting is based on determining one or more access rules associated with the firewall are invoked.

In another aspect, the service provider node is configured to: generate a secure redirect weblink between the computing device and the RBI server; and transmit the secure redirect weblink to a browser of the RBI server.

In another aspect, the redirect weblink comprises identification information including an address of the RBI server, and an authentication request.

In another aspect, the RBI server is configured to: prompt the computing device for authentication information related to the network; and transmit the authentication information to an identity provider node via the firewall.

In another aspect, the firewall resides at a private network, that includes the computing device.

In another aspect, the firewall resides at a private network, that includes the service provider node configured to verify the service request of the computing device and an identity provider node in a public network configured to identify the computing device for verification prior to authenticating a user using the computing device for access.

In one aspect, one or more non-transitory computer-readable medium having embodied thereon a program executable by a processor for implementing a method for providing access to a network include computer-readable instructions, is disclosed. The method includes intercepting a request, at a firewall, the request sent from a computing device regarding establishment of a secure communication session with a network. The method in response to determining that the resource request is unauthenticated, notifying a service provider node of the resource request. The service provider node is configured to generate a communication session between the computing device and a RBI server. The method includes receiving, at the firewall, authentication information pertaining to authorization for the computing device to establish the secure communication session with the network. The method includes receiving, at the firewall, authentication information pertaining to authorization for the computing device to establish the secure communication session with the network. The method includes identifying that the secure communication session is allowed to be established based on the authentication information. The method includes providing access, at the firewall, to the computing device to establish the secure communication session with the network.

Example Embodiments

Access control is a fundamental aspect of network security, that allows users to access resources, such as webpages and file-sharing services only after they have proven their identities. In an example, a user can direct their device, sitting on the Local Area Network (LAN) side of a firewall that has been configured with an access rule for the user, to access the Wide Area Network (WAN) internet secured behind the firewall. When the user first attempts to browse the web through the firewall, they are often redirected to a login page. After entering their correct credentials, the user can access the internet. If incorrect credentials are provided, this same login page will continue to appear instead of fetching the intended web page.

Oftentimes, the account information for authentication is typically stored in a firewall itself or a standalone authentication server such as LDAP or RADIUS. In either case, the login page can be served from the firewall. One example of authentication exchange can be implemented via SAML (Security Assertion Markup Language). SAML is an authentication mechanism that provides more convenience and security than traditional methods and is cloud-based, standing away from the facility where end users or firewalls are located.

Security Assertion Markup Language (SAML) is an XML-based open standard for exchanging authentication and authorization data between parties, in particular between an identity provider (IdP) and a service provider (SP).

SAML enables single sign-on (SSO), allowing users to authenticate at one entity or identity provider and then be able to access multiple service providers. Due to the protocol of SAML, authentication takes place directly between the end user and the SAML provider (IdP) and SAML SP, with third parties such as firewalls unable to interfere in the process. As a result, after SAML authentication is introduced, the login page is not served from the firewall anymore; instead, it can be directly introduced from the SAML Idp.

SAML authentication is a two-step process in which an Identity Provider (IDP) first verifies the user's credentials before providing access to the requested resource. The IdP then sends a signed authentication assertion to the relying party (i.e., SP), which verifies the assertion from the IDP before granting access. SAML is used to protect against unauthorized access to networked resources by providing an additional layer of authentication. By leveraging SAML, firewalls can ensure that only authenticated users are allowed access to a particular network or resource.

Before describing the proposed techniques and methods, an example firewall implementation is illustrated in FIG. 1.

FIG. 1 illustrates communications being intercepted between client devices and a network within a protected network, according to some aspects of the present disclosure. FIG. 1 includes a client device 104 communicating with a firewall 102 to initiate interactions with a public network 108. The firewall 102 can be a security device that actively monitors and filters incoming traffic 110 and outgoing network traffic from the public network 108, the client device 104, or additional computing devices 106a, 106b.

In some examples, the firewall 102 can monitor the incoming traffic 110 and outgoing traffic 112, act as a barrier, and transmit information to its intended destination based on a plurality of predetermined access rules. Access rules can be used to control which types of data are allowed in or out of the public network 108, as well as which ports and protocols should be blocked or allowed. Access policies can also be established to specify what type of traffic is permitted on the network from the client device 104 as well as which users or systems are allowed to access the network. With these rules and policies in place, any suspicious activity can be quickly identified and blocked from entering the system. This ensures that only legitimate traffic is allowed on the network and helps to protect confidential information.

As the client device 104 attempts to interact with the public network 108, the firewall 102 can intercept the interaction between the client device 104 and the public network 108. Similarly, the firewall can also protect the interaction between the public network 108 and the client device 104.

In some examples, the firewall 102 can also be configured to monitor incoming traffic 110 from one or more computing devices 106a, 106b. The computing devices 106a, 106b can be configured to communicate with the firewall 102 to support the monitoring of incoming traffic 110 intercepted from the client device 104. In some examples, computing device 106a and computing device 106b can be configured to perform different functions that support the tracking of the incoming traffic 110 and the outgoing traffic 112.

Figure 2:
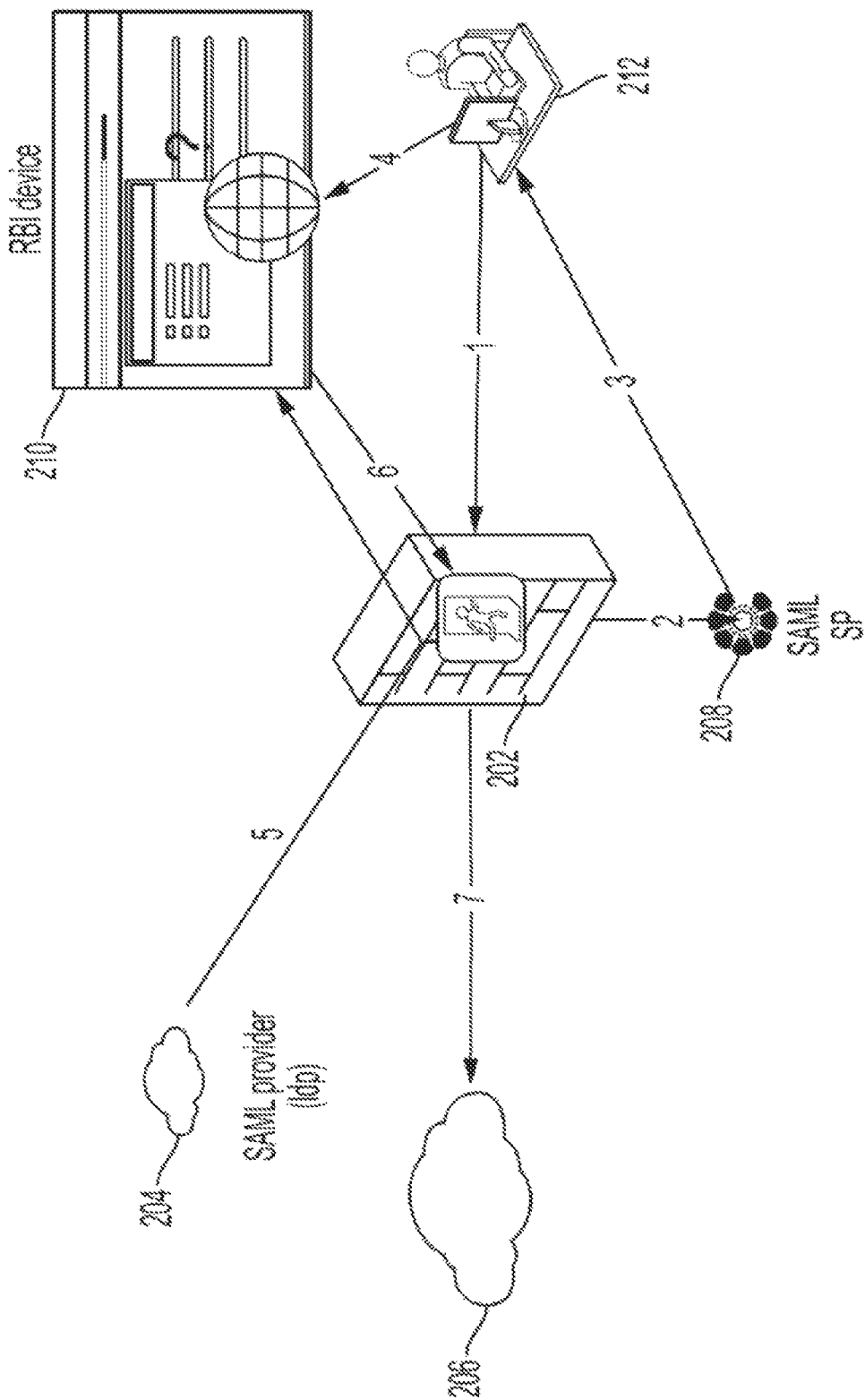
FIG. 2 illustrates an exemplary set of steps that a firewall may perform while protecting a computer network, according to some aspects of the present disclosure.

FIG. 2 illustrates an exemplary set of steps that a firewall may perform while protecting a computer network, according to some aspects of the present disclosure. The examples discussed in FIG. 2 using a RBI server 210 designed to load a webpage on a different device from the client device 212 initially intending to connect to the network 206. Thus, a web browser of the client device 212 can manipulate and interact with a webpage configured to receive authentication information on the RBI server 210 via the active client device 212. By integrating the RBI device 210 into the monitoring process of the firewall 202, the RBI device 210 can isolate the authentication webpage from the firewall 202 by receiving the authentication information in a secure virtual container. Thus, this integration can prevent the user from accessing any WAN resources other than those necessary for completing SAML authentication. Alternatively, in some embodiments, the RBI server can also be deployed in a standalone RBI server. In essence, the implementation of virtualization technology such as the RBI server 210 can allow the user of the client device 212 to access web content without exposing the client device to potential harm.

FIG. 2 provides an exemplary example of integrating the RBI server 210 into the firewall 202 monitoring process of incoming and outgoing traffic from the client device 212 or the network 206.

In step 1, the user, using a client device 212, can commit an interaction action attempting to interact with the network 206, to access one or more resources provided by the network 206. The client device 212 transmits the interaction action as a request to access resources from the network 206 The firewall 202, actively monitoring incoming traffic and outgoing traffic, can intercept the interaction based one or more access rules of the firewall 202 as it relates to the network 206.

In step 2, the firewall can determine if the request is authenticated. Upon determining the request is unauthenticated, the firewall notifies the SAML SP 208 of the authentication request as well as the address of the client device.

In step 3, the SAML SP 208, upon receiving the notification of the request, generates a redirect link for the client device 212 to access for submitting a set of authentication information. In an example, the redirect link comprises an RBI address with a SAML IDP login page address, as an encoded or encrypted HTTP parameter. The encoded or encrypted HTTP parameter thus, can prevent the user from accessing any WAN resources other than those necessary for completing SAML authentication.

In step 4, the client device 212, upon accessing the redirect link received from the SAML SP 208, can connect to the RBI server 210 hosting a destination webpage of the redirect link. The client device 212 can be prompted for authentication information to authenticate the client device 212 for authorization to access the network 206. The authentication information can include various types of credentials, such as usernames and passwords, biometric authentication measures such as fingerprints, facial recognition or voice recognition, multi-factor authentication (MFA) combining two or more elements of authentication, and single sign-on (SSO) credentials allowing the user of the client device 212 to access multiple applications with the single set of credentials.

In step 5, the RBI server 210 can communicate with the SAML IDP 204 for verification of the client device 104. The SAML IDP 204 is configured to verify the authentication information, the user, and the client device 212 to determine one or more levels of access to the network 206 the client device 212 is authorized for. In an example, a user can enter a set of credentials, such as a username or password, into a login page of the SAML IDP 204. The SAML IDP 204, upon determining a successful authorization and a level of access for the client device, based on these credentials, can communicate the authorization and the level of access to the RBI server 210, completing the verification of the client device 212.

In step 6, the RBI server 210 transmits the successful authorization and the level of access to the firewall 202, indicating that the client device 212 is authorized to access the network 206, and the levels of access the client device 212 has been provided authorization to access.

In step 7, the firewall 202 accepts the request of the client device 212, and transmits the request to the network, establishing a secure communication session with the network 206.

In some examples, the secure communication session established with the network 206 can further be applied to additional devices the user of the client device 212, or the client device 212 itself are associated with. Based on the authentication information and the initial verification by the RBI server 210 and the SAML IDP 204, additional devices associated with the client device 212, can also be authenticated and authorized for secure communication session with the network 206.

Figure 3:
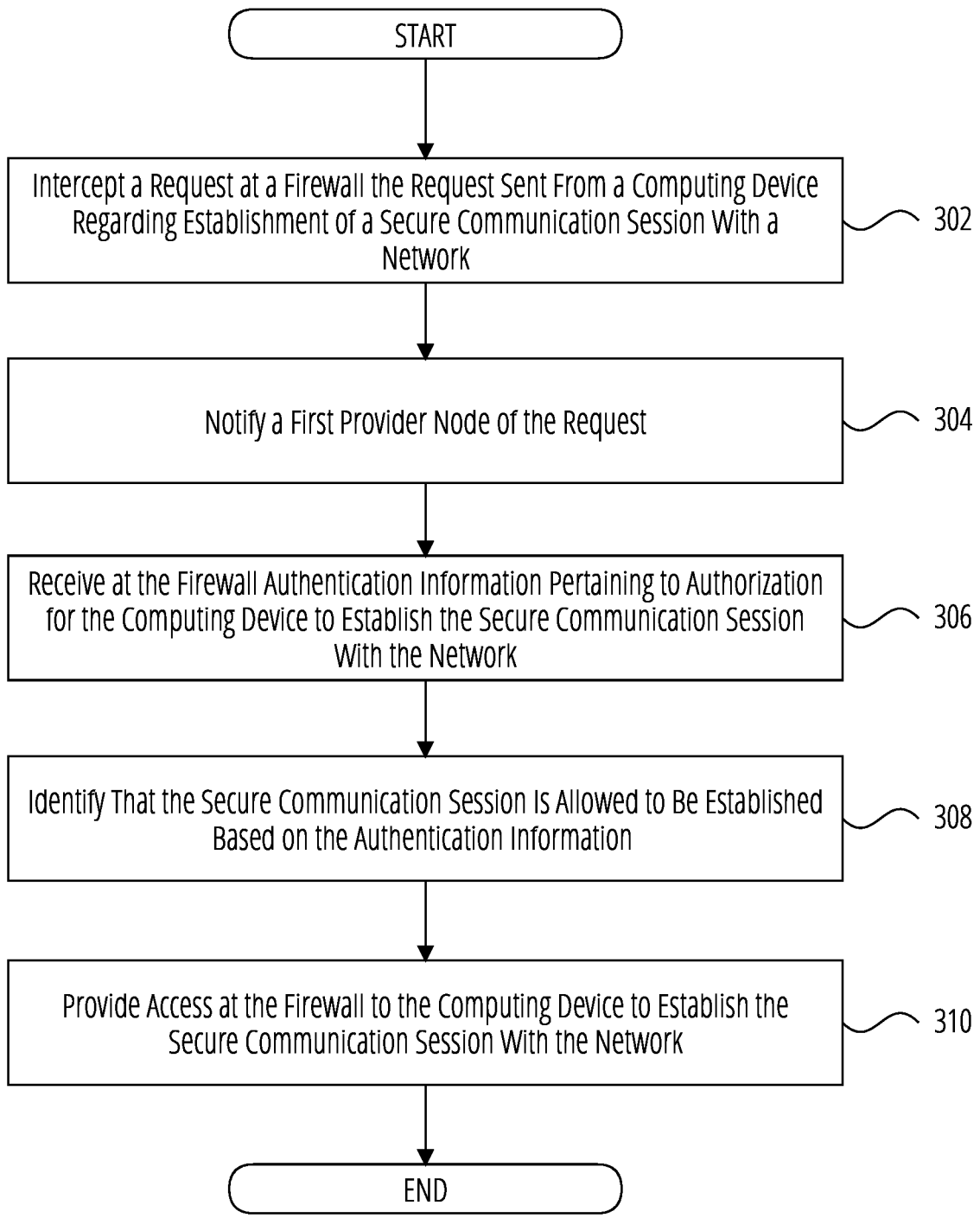
FIG. 3 illustrates an example method for providing a computing device access to a network, according to some aspects of the present disclosure.

FIG. 3 illustrates an example method 300 for providing access to a network. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At step 302, the method includes intercepting a request at a firewall the request sent from a computing device regarding establishment of a secure communication session with a network.

For example, the firewall 202 illustrated in FIG. 2 may intercept a request sent from a computing device regarding establishing a secure communication session with the network. The request can include a resource request and an authentication request to connect to the network. The intercepting can be based on determining whether one or more access rules associated with the firewall are invoked.

In an example, the firewall 202 can reside in a private network, that includes the client device 212.

In an example, the firewall 202 can reside at a private network, that includes the SAML SP 208 configured to verify the request of the computing device and the SAML IDP 204 configured to identify the computing device for verification.

At step 304, the method includes notifying a service provider node of the request from the computing device.

For example, the firewall 202 illustrated in FIG. 2 may notify the SAML SP 208 of the request from the client device 212. The SAML SP 208 is then configured to generate a communication session between the client device 212 and a RBI server, such as an RBI server 210.

For example, upon the SAML SP 208 illustrated in FIG. 2 generating a communication session between the client device 212 and the RBI server 210, the client device 212 can be prompted for authentication information related to the network 206.

In an example, the SAML IDP 204 can be configured to verify the authorization of the client device 212 to establish the secure communication session with the network 206. Accordingly, the RBI server 210 can be configured to communicate with an identity provider node.

In an example, the method can further include generating a secure redirect weblink between the computing device and the RBI server. For example, the SAML SP 208 illustrated in FIG. 2 can generate a secure redirect weblink between the client device 212 and the RBI server 210. The redirect weblink can include identification information including an address of the RBI server 210, an authentication request, and an encoded or encrypted HTTP parameter, preventing the user from accessing any WAN resources other than those necessary for completing SAML authentication. The RBI server can further be customized to default to disallow all user initiated incoming traffic, and to instead direct the user to complete the SAML authentication. Thus, only SAML SP redirect traffic is permitted.

In an example, the method further includes transmitting the secure redirect weblink to a browser of the computing device. For example, the SAML SP 208 illustrated in FIG. 2 may transmit the secure redirect weblink to a browser of the client device 212.

Further, the method can further include transmitting the authentication information to an identity provider node via the firewall. For example, the RBI server 210 illustrated in FIG. 2 can transmit the authentication information to the SAML IDP 204 via the firewall 202.

At step 306, the method includes receiving at the firewall authentication information pertaining to authorization for the computing device to establish the secure communication session with the network. For example, the firewall 202 illustrated in FIG. 2 may receive authentication information pertaining to authorization for the client device 212 to establish the secure communication session with the network 206.

At step 308, the method includes identifying that the secure communication session is allowed to be established based on the authentication information. For example, the firewall 202 illustrated in FIG. 2 may identify that the secure communication session is allowed to be established based on the authentication information received from the SAML IDP 204.

At step 310, the method includes providing access at the firewall to the computing device to establish a secure communication session with the network. For example, the firewall 202, illustrated in FIG. 2, may provide access to the client device 212 to establish a secure communication session with the network.

Figure 4:
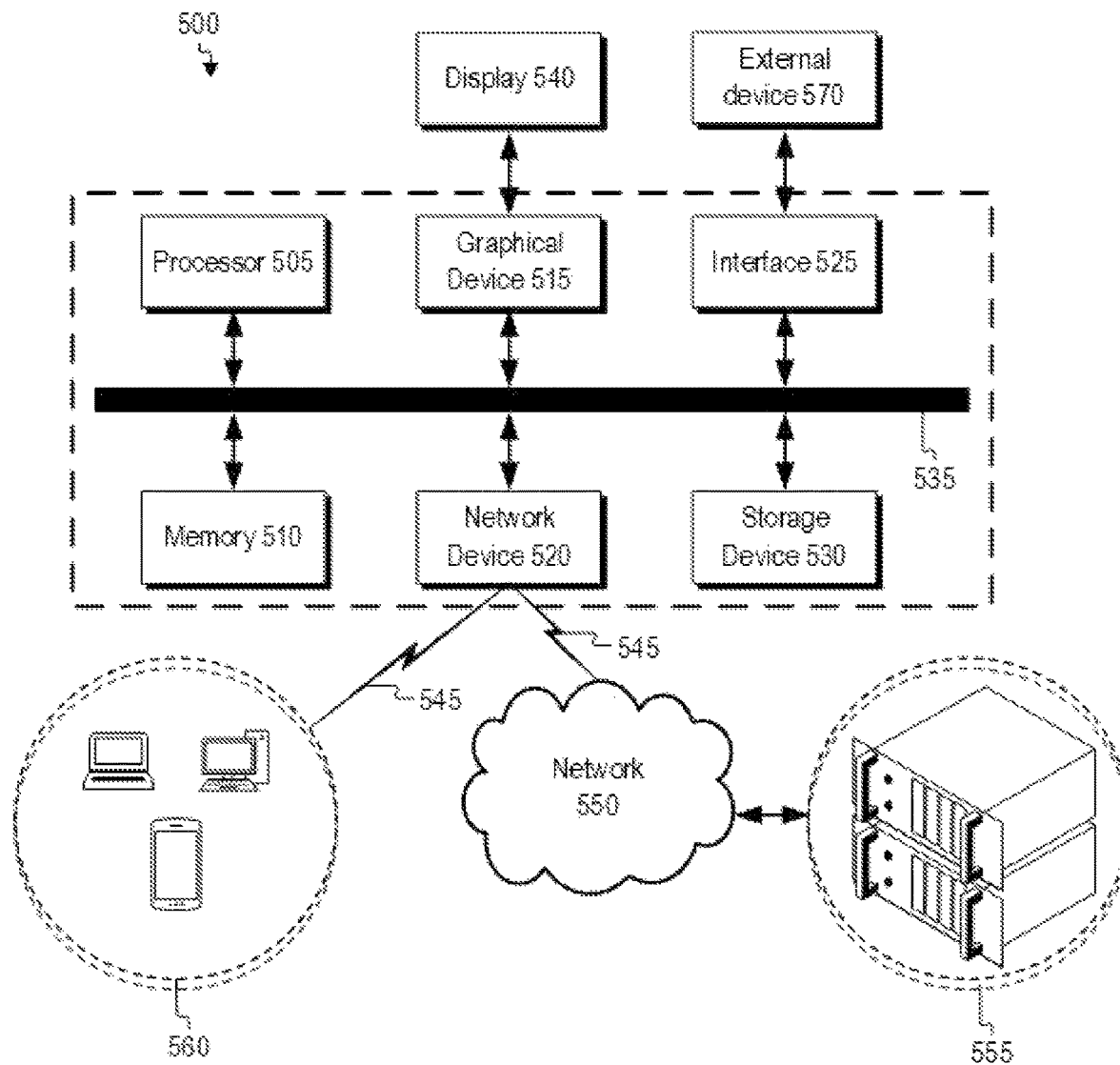
FIG. 4 illustrates an aspect of the subject matter in accordance with one embodiment.

FIG. 4 illustrates an example computer system 400 for implementing a part of the instant disclosure. For example, the example computer system 400 may execute a client application for performing the instant disclosure.

The example computer system 400 includes a processor 405, a memory 410, a graphical device 415, a network device 420, interface 425, and a storage device 430 that are connected to operate via a bus 435. The processor 405 reads causes machine instructions (e.g., reduced instruction set (RISC), complex instruction set (CISC), etc.) that are loaded into the memory 410 via a bootstrapping process and executes an operating system (OS) for executing application within frameworks provided by the OS. For example, the processor 405 may execute an application that executes an application provided by a graphical framework such as Winforms, Windows Presentation Foundation (WPF), Windows User Interface (WinUI), or a cross-platform user interface such as Xamarin or QT. In other examples, the processor 405 may execute an application that is written for a sandbox environment such as a web browser.

The processor 405 controls the memory 410 to store instructions, user data, OS content, and other content that cannot be stored within the processor 405 internally (e.g., within the various caches). The processor 405 may also control a graphical device 415 (e.g., a graphical processor)

that outputs graphical content to a display 440. In some example, the graphical device 415 may be integral within the processor 405. In yet another example, the display 440 may be integral with the computer system 400 (e.g., a laptop, a tablet, a phone, etc.).

The graphical device 415 may be optimized to perform floating point operations such as graphical computations, and may be configured to execute other operations in place of the processor 405. For example, controlled by instructions to perform mathematical operations optimized for floating point math. For example, the processor 405 may allocate instructions to the graphical device 415 for operations that are optimized for the graphical device 415. For instance, the graphical device 415 may execute operations related to artificial intelligence (AI), natural language processing (NLP), vector math. The results may be returned to the processor 405. In another example, the application executing in the processor 405 may provide instructions to cause the processor 405 to request the graphical device 415 to perform the operations. In other examples, the graphical device 415 may return the processing results to another computer system (i.e., distributed computing).

The processor 405 may also control a network device 420 for transmits and receives data using a plurality of wireless channels 445 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 420 may wirelessly connect to a network 450 to connect to servers 455 or other service providers. The network device 420 may also be connected to the network 450 via a physical (i.e., circuit) connection. The network device 420 may also directly connect to local electronic device 460 using a point-to-point (P2P) or a short range radio connection.

The processor 405 may also control an interface 425 that connects with an external device 470 for bidirectional or unidirectional communication. The interface 425 is any suitable interface that forms a circuit connection and can be implemented by any suitable interface (e.g., universal serial bus (USB), Thunderbolt, and so forth). The external device 465 is able to receive data from the interface 425 to process the data or perform functions for different applications executing in the processor 405. For example, the external device 465 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

Figure 5:
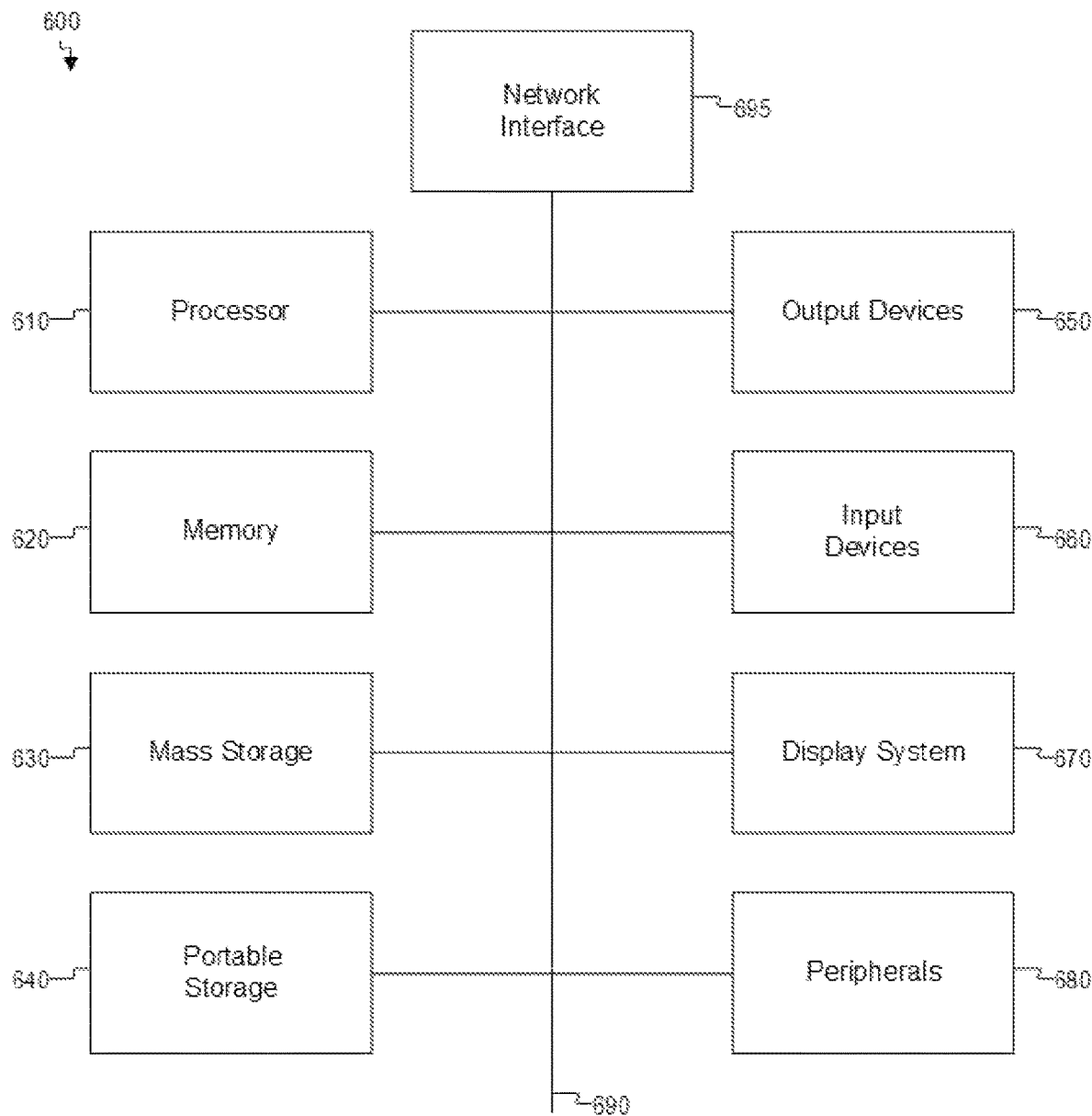
FIG. 5 illustrates an example computing system implemented with a network interface, according to some aspects of the present disclosure.

FIG. 5 illustrates an example computing system 500 implemented with a network interface, according to some aspects of the present disclosure. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 530 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, IOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is in-tended that the scope of the technology be defined by the claim.

What is claimed is:

1. A method for providing access to a network, the method comprising:
    intercepting a request at a firewall that resides in a private network, wherein the request is unauthenticated, sent from a computing device, and corresponds to a plurality of security assertion markup language (SAML) requests;
    identifying the computing device by an identity provider node in a public network, wherein the identity provider node identifies the computing device for verification prior to authenticating the computing device for access; and
    notifying a service provider node of the request, wherein the service provider node verifies the request by:
        generating a communication session between the computing device and a remote browser isolation (RBI) server;
        receiving, at the firewall, authentication information pertaining to authorization for the computing device to establish a secure communication session with the private network;
        identifying that the secure communication session is allowed to be established based on the authentication information; and
        providing the computing device with authorization to establish the secure communication session and access the private network.

2. The method of claim 1, wherein the request is a resource request.

3. The method of claim 2, wherein the resource request further includes an authentication request to connect to the private network.

4. The method of claim 3, wherein the RBI server communicates with the identity provider node, and wherein the identity provider node verifies the authentication request prior to the authorization of the computing device to establish the secure communication session with the private network.

5. The method of claim 1, wherein intercepting the request is based on determining that one or more access rules associated with the firewall are invoked.

6. The method of claim 1, further comprising generating a secure redirect weblink that redirects to the RBI server; and transmitting the secure redirect weblink to a browser of the computing device.

7. The method of claim 6, wherein the secure redirect weblink includes an address of the RBI server.

8. The method of claim 1, further comprising prompting the computing device for the authentication information, and transmitting the authentication information to an identity provider node via the firewall.

9. The method of claim 1, wherein the private network further includes the computing device.

10. A non-transitory computer-readable storage medium, the non-transitory computer-readable storage medium having embodied thereon a program executable by a processor for implementing a method for providing access to a network, the method comprising:
    intercepting a request at a firewall that resides in a private network, wherein the request is unauthenticated, sent from a computing device, and corresponds to a plurality of security assertion markup language (SAML) requests;
    identifying the computing device by an identity provider node configured in a public network, wherein the identity provider node identifies the computing device for verification prior to authenticating the computing device for access; and
    notifying a service provider node of the request, wherein the service provider node verifies the request by:
        generating a communication session between the computing device and a remote browser isolation (RBI) server;
        receiving, at the firewall, authentication information pertaining to authorization for the computing device to establish a secure communication session with the private network;
        identifying that the secure communication session is allowed to be established based on the authentication information; and
        providing the computing device with authorization to establish the secure communication session and access the private network.

11. The non-transitory computer-readable storage medium of claim 10, wherein the request is a resource request.

12. The non-transitory computer-readable storage medium of claim 11, wherein the resource request further includes an authentication request to connect to the private network.

13. The non-transitory computer-readable storage medium of claim 12, wherein the RBI server communicates with the identity provider node, and wherein the identity provider node verifies the authentication request prior to the authorization, of the computing device to establish the secure communication session with the private network.

14. The non-transitory computer-readable storage medium of claim 10, wherein intercepting the request is based on determining that one or more access rules associated with the firewall are invoked.

15. The non-transitory computer-readable storage medium of claim 10, further comprising instructions executable to generate a secure redirect weblink that redirects to the RBI server and to transmit the secure redirect weblink to a browser of the computing device.

16. The non-transitory computer-readable storage medium of claim 15, wherein the secure redirect weblink includes an address of the RBI server.

17. The non-transitory computer-readable storage medium of claim 10, further comprising instructions executable to prompt the computing device for the authentication information, and to transmit the authentication information to an identity provider node via the firewall.

18. The non-transitory computer-readable storage medium of claim 10, wherein the private network further includes the computing device.

19. A system for providing access to a network, the system comprising:
  a firewall that resides in a private network, wherein the firewall intercepts a request that is unauthenticated, sent from a computing device, and corresponds to a plurality of security assertion markup language (SAML) requests;
  an identity provider node in a public network, wherein the identity provider node identifies the computing device for verification prior to authenticating the computing device for access; and
  a service provider node that is notified of the request and verifies the request by:
    generating a communication session between the computing device and a remote browser isolation (RBI) server, wherein the firewall receives authentication information pertaining to authorization for the computing device to establish a secure communication session with the private network,
    identifying that the secure communication session is allowed to be established based on the authentication information, and
    providing the computing device with authorization to establish the secure communication session and access the private network.

20. The system of claim 19, wherein the request is a resource request.

* * * * *